April 14, 1964  T. H. GEWECKE  3,128,504
METHOD FOR MAKING A PLASTIC DRIP CHAMBER
Original Filed May 19, 1958

INVENTOR.
Theodore H Gewecke
BY
Ralph Hammar
attorney

# United States Patent Office 3,128,504
Patented Apr. 14, 1964

3,128,504
METHOD FOR MAKING A PLASTIC DRIP CHAMBER
Theodore H. Gewecke, Glenview, Ill., assignor, by mesne assignments, to McGaw Laboratories, Inc., Milledgeville, Ga., a corporation of Delaware
Original application May 19, 1958, Ser. No. 736,304. Divided and this application Mar. 10, 1961, Ser. No. 102,342
3 Claims. (Cl. 18—36)

This invention relates to drip chambers for the administration of parenteral solutions and made from transparent thermoplastic tubing, large diameter tubing being used for the body of the chamber and small diameter tubing being used for the inlet and outlet. In such chambers it is essential that the inlet tube project centrally into the body of the chamber in position so that the drops may be counted. This is accomplished by flowing the upper end of the outer tube inwardly under heat and pressure to a dome shape and fusing it edgewise to the inlet tube at a point intermediate the upper and lower ends. The dome shape is ideal for centering the inlet tube and for holding the outer tube in a true circular shape. Accordingly even though the dome shaped section has thin walls, the inlet tube is securely held in a central position where the drops can be readily observed. The fact that the body of the chamber is circular minimizes distortion and permits the drops to be accurately counted from any point of observation. Although the drip chamber looks as though it could be made only by a molding operation, it is, in fact, made from lengths of thermoplastic tubing which have a much lower cost. In addition, a polyvinyl plastic drip chamber made by this method may be sterilized at a temperature of 250 degrees F. without distortion whereas a plastic drip chamber made from the same material by molding would be distorted if exposed to the same conditions for sterilization.

This application is a division of application Serial Number 736,304, filed May 19, 1958 and now abandoned.

Figure 1:
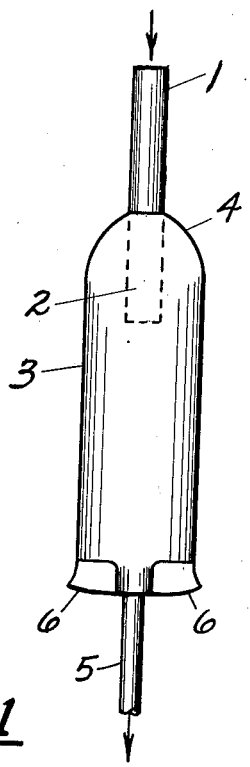
Figure 3:
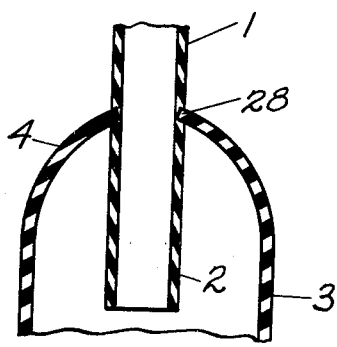
Figure 2:
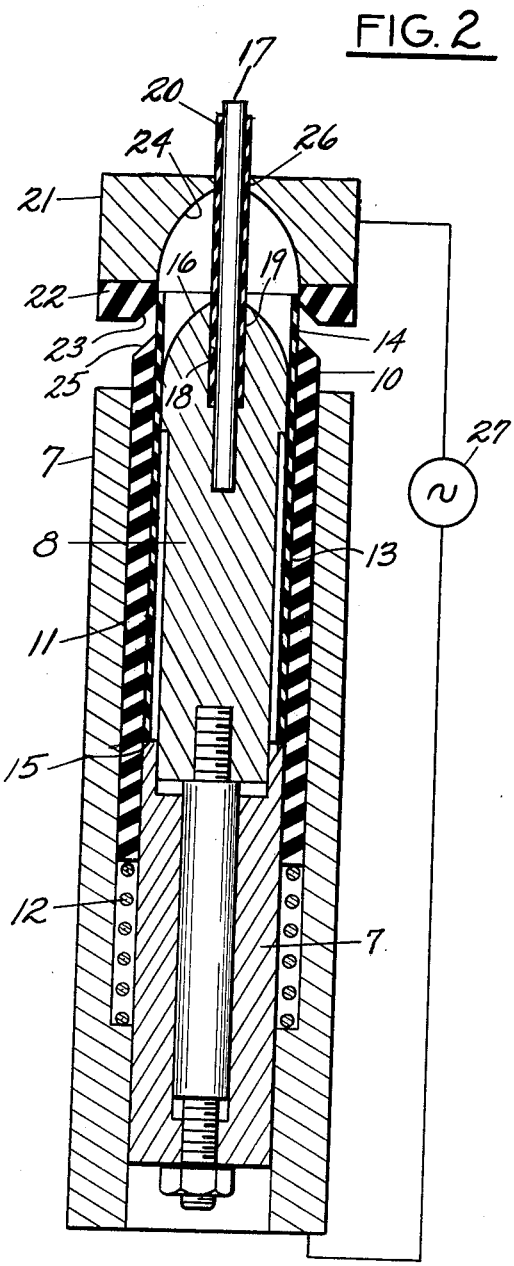

In the drawing, FIG. 1 is an elevation of a plastic drip chamber; FIG. 2 is a section through the mold for making the drip chamber from lengths of thermoplastic tubing; and FIG. 3 is an enlarged section through the upper end of the drip chamber.

The liquid to be administered is fed through an inlet tube 1 having its lower end 2 depending centrally within a drip chamber 3. At the upper end of the drip chamber is a dome shaped section 4 which forms the connection between the body of the drip chamber and the inlet tube 1. The body of the drip chamber and the inlet tube are made of thermoplastic material such as, for example, one of the vinyl plastics, the body of the chamber being of clear or transparent plastic and the inlet tube being ordinarily colored so that its lower end will be readily visible through the wall of the drip chamber. At the lower end the drip chamber is sealed to plastic outlet tubing 5 in any conventional manner, for example by heat sealing at 6.

Although the drip chamber looks as though it could only be made by integrally molding the body and inlet tube, it is, in fact, made from lengths of standard thermoplastic tubing in a mold such as shown in FIG. 2. The body 7 of the mold has at its center an upstanding spindle 8. Surrounding the spindle 8 and in spaced relation thereto is an annular sleeve 10 of insulating material slidably received in a bore 11 in the mold body and resiliently urged upward by a coil spring 12. The sleeve 10 is shown in its uppermost position. Between the inner surface of the sleeve 10 and the outer surface of the spindle 8 is an annular recess 13 slidably receiving a length of thermoplastic tubing 14. The lower end of the tubing rests on a shoulder 15 and although the tubing may be quite limp, it is adequately supported throughout its length by the spindle 8 and sleeve 10. When loaded, the upper end of the tube 14 is slightly above the spherical or domed surface 16 on the upper end of the spindle 8. At the center of the spindle 8 is fixed a small diameter pin 17 which projects within a cylindrical cavity 18 in the spindle 8 and provides an annular recess 19 for receiving the lower end of a length of small diameter thermoplastic tubing 20. The tubing 20 has a sliding fit in the annular recess 19 and is firmly supported by the pin 17 on its inner surface and by the outer walls of the recess 19 engaging its outer surface.

The mold cap 21 has a rim 22 of insulating material with a tapered mouth 23 leading to a dome shaped cavity 24. The taper at 23 on the rim matches a taper 25 at the upper end of the sleeve 14 providing a tight joint when the cap is lowered onto the mold body. In the top of the cap is an opening 26 through which the tube 20 readily slides as the cap is lowered. The mold cap and body are insulated from each other and are connected to a source 27 of high frequency current which causes localized heating of the plastic between the dome shaped surfaces 16 and 24 and between the pin 17 and the opening 26 as the mold cap is closed on the mold body.

As the mold cap 21 is lowered, the upper end of the tubing 14 is guided into the cavity 24 by the tapered mouth 23 and is bent edgewise inward toward the outer surface of the tube 20. The space between the dome shaped surfaces 16 and 24 in the closed position of the mold is preferably less than the wall thickness of the tubing 14 so that there is a plastic flow which smooths out any wrinkles and squeezes the fluid plastic into intimate contact with the outer surface of the tubing 20 which likewise is in a softened condition by reason of the high frequency dielectric heating. An examination of the finished product shows that there is produced a dome shaped section 4 having its inner edge fused as indicated at 28 to the outer surface of the tube 1. In section, the fusion is quite evident due to the difference in color between the plastic. In some cases there may be a skin of liquid plastic from the tube 14 flowing up along the outside of the tube 1 and fused thereto to extend the joint. This is not necessary as adequate sealing is obtained by the edgewise fusion illustrated in FIG. 3. The dome section 4 is free of wrinkles indicating that the plastic is heated to a flowable state so that it can conform to the dome shaped cavity between the surfaces 16 and 24. Because of the flowing of the plastic, it is unnecessary to have slits or notches or the special formations in the upper end of the tube 14 in order to facilitate the inward folding or bending of the material. The ordinary cut end of the tubing is all that is needed. The closing of the mold by engagement of the tapers 23, 25 while the dome surfaces 16, 24 are still quite widely separated provides lateral support for the upper end of the tubing 14 at the start of the bending or forming operation when there perhaps would be a greater tendency for the tube to buckle. As the mold continues its closing movement, the surfaces 23, 25 remain in engagement and the insulating sleeve 10 is merely moved downward to the extent necessary to permit complete closing of the mold cavity. The dielectric heating produced by the high frequency current source 27 is confined primarily to the plastic tubing and accordingly acts very rapidly because of the small mass of plastic to be heated. The complete forming and sealing operation requires only a few seconds after the lengths of tubing are loaded into the mold. The tight seal between the tapered surfaces 23, 25 minimizes the squeezing of plastic out between those surfaces to form an external ridge.

It is not necessary that the tube 1 be joined to the dome section 4 intermediate its ends as shown in FIG. 1. If the annular recess 19 is eliminated so that the lower end of the tube 20 is flush with the dome surface 16, the domed section 4 of plastic will be fused to the lower end of the tube 20 with the same character of joints as that illustrated in FIG. 3. There is an actual liquid flow of the plastic with the two kinds of plastic coming together.

What is claimed as new is:

1. A mold for making a drip chamber from thermoplastic tubing comprising a mold body having a cylindrical cavity of insulating material with an upstanding metal spindle at its center forming an annular recess between it and the cavity for receiving the lower end of a length of transparent thermoplastic tubing, said spindle having a dome shaped upper end extending above said annular recess and opposite the upper end of said length of tubing, a small diameter metal spindle projecting up from the center of said dome shaped upper end for receiving a length of smaller diameter thermoplastic tubing, said dome shaped section having a reentrant annular recess for receiving the lower end of the smaller diameter tubing a controlled distance below the outer surface of said dome section, a metal mold cap having a cavity complementary to and of slightly larger size than said dome section and having a central opening slidably receiving the upper end of said small diameter tubing, insulating means between said mold cap and body, a source of high frequency voltage connected between the cap and body as they are closed under pressure together for creating an electric field between the cap and spindles for softening the tubing and causing the outer tubing to soften and flow to a dome shape and to be fused edgewise to said small diameter tubing.

2. A mold for making a chamber from thermoplastic tubing comprising a mold body having a cylindrical cavity of insulating material with an upstanding metal spindle at its center forming an annular recess between it and the cavity for receiving the lower end of a length of thermoplastic tubing, said spindle having a dome shaped upper end extending above said annular recess and opposite the upper end of said length of tubing, a small diameter metal spindle projecting up from the center of said dome shaped upper end for receiving a length of smaller diameter thermoplastic tubing, a metal mold cap having a cavity complementary to and of slightly larger size than said dome section and having a central opening slidably receiving the upper end of said small diameter tubing, insulating means between said mold cap and body, a source of high frequency voltage connected between the cap and body as they are closed under pressure for creating an electric field between the cap and spindles for softening the tubing and causing the outer tubing to soften and flow to a dome shape and to be fused edgewise to said small diameter tubing.

3. A mold for making a chamber from thermoplastic tubing comprising a mold body having a cylindrical cavity with an upstanding metal spindle at its center, a sleeve of insulating material slidably received in the cavity with its inner surface spaced from the spindle to provide an annular recess between it and the spindle for receiving the lower end of a length of thermoplastic tubing, said spindle having a dome shaped upper end extending above said annular recess and opposite the upper end of said length of tubing, a small diameter metal spindle projecting up from the center of said dome shaped upper end for receiving a length of smaller diameter thermoplastic tubing, a metal mold cap having a cavity complementary to and of slightly larger size than said dome section and having a central opening slidably receiving the upper end of said small diameter tubing, spring means urging said sleeve to a position in which its upper end projects above said mold body in position to be engaged by the mold cap and forced downward as the cap is closed on the body, said sleeve supporting said tube as the cap is closed, a source of high frequency voltage connected between the cap and body as they are closed under pressure for creating an electric field between the cap and spindles for softening the tubing and causing the outer tubing to soften and flow to a dome shape and to be fused edgewise to said small diameter tubing.

References Cited in the file of this patent

UNITED STATES PATENTS

| 2,169,315 | Yngve | Aug. 15, 1939 |
| 2,413,338 | Small | Dec. 31, 1946 |
| 2,419,864 | Westin | Apr. 29, 1947 |
| 2,514,937 | Collins | July 11, 1950 |
| 2,922,256 | Breadner et al. | Jan. 26, 1960 |

FOREIGN PATENTS

| 167,455 | Austria | Jan. 10, 1951 |